United States Patent
Willgert et al.

(10) Patent No.: US 10,211,488 B2
(45) Date of Patent: Feb. 19, 2019

(54) BATTERY PACK INTERFACE SYSTEM

(71) Applicant: HUSQVARNA AB, Huskvarna (SE)

(72) Inventors: Mikael Willgert, Spånga (SE); Martin Larsén, Jönköping (SE); Lars Dernebo, Ödeshög (SE)

(73) Assignee: HUSQVARNA AB, Huskvarna (SE)

( * ) Notice: Subject to any disclaimer, the term of this patent is extended or adjusted under 35 U.S.C. 154(b) by 65 days.

(21) Appl. No.: 14/763,201

(22) PCT Filed: Jan. 30, 2014

(86) PCT No.: PCT/US2014/013832
§ 371 (c)(1),
(2) Date: Jul. 24, 2015

(87) PCT Pub. No.: WO2014/120912
PCT Pub. Date: Aug. 7, 2014

(65) Prior Publication Data
US 2015/0357684 A1    Dec. 10, 2015

Related U.S. Application Data

(60) Provisional application No. 61/759,515, filed on Feb. 1, 2013.

(51) Int. Cl.
*H01M 10/46* (2006.01)
*H01M 2/10* (2006.01)
(Continued)

(52) U.S. Cl.
CPC ......... *H01M 10/46* (2013.01); *H01M 2/1055* (2013.01); *H01M 10/4257* (2013.01);
(Continued)

(58) Field of Classification Search
CPC ...................................................... H01M 10/46
(Continued)

(56) References Cited

U.S. PATENT DOCUMENTS 5,734,253 A * 3/1998 Brake .................. H02J 7/0027
                                                  320/125
5,780,991 A * 7/1998 Brake ................ H01M 10/441
                                                  320/106
(Continued)

FOREIGN PATENT DOCUMENTS

EP    982830 A2    3/2000
GB    2292845 A    3/1996

OTHER PUBLICATIONS

International Search Report and Written Opinion for International Application No. PCT/US2014/013832 dated May 14, 2014, all enclosed pages cited.
(Continued)

*Primary Examiner* — Samuel Berhanu
*Assistant Examiner* — Tessema Kebede
(74) *Attorney, Agent, or Firm* — McNair Law Firm, P.A.

(57) ABSTRACT

A battery charging system may include one or more battery packs each of which includes control circuitry and a switching assembly, and a charger including a power section and a charge controller. The charge controller and/or the control circuitry may be configured to direct operation of the switching assembly to control charging of the one or more battery packs.

20 Claims, 8 Drawing Sheets

(51) Int. Cl.
  *H01M 10/42* (2006.01)
  *H02J 7/00* (2006.01)

(52) U.S. Cl.
  CPC ....... *H02J 7/007* (2013.01); *H01M 2200/103* (2013.01); *H01M 2220/30* (2013.01); *H02J 7/0021* (2013.01)

(58) Field of Classification Search
  USPC .......................................... 320/112
  See application file for complete search history.

(56) References Cited

U.S. PATENT DOCUMENTS

| | | | | |
|---|---|---|---|---|
| 6,184,659 | B1* | 2/2001 | Darmawaskita | H02J 7/0052 |
| | | | | 320/137 |
| 6,933,689 | B2* | 8/2005 | Yamamoto | B25F 5/02 |
| | | | | 173/178 |
| 7,002,265 | B2* | 2/2006 | Potega | B60L 11/185 |
| | | | | 307/149 |
| 7,003,679 | B1 | 2/2006 | Lesea et al. | |
| 8,441,230 | B2* | 5/2013 | Boyles | H02J 7/0013 |
| | | | | 320/107 |
| 2003/0201738 | A1 | 10/2003 | Yamamoto | |
| 2004/0263123 | A1* | 12/2004 | Breen | H02J 7/0022 |
| | | | | 320/128 |
| 2005/0248311 | A1* | 11/2005 | Komaki | G06F 1/28 |
| | | | | 320/112 |
| 2006/0108982 | A1* | 5/2006 | Daou | H02J 7/0031 |
| | | | | 320/116 |
| 2009/0274948 | A1* | 11/2009 | Calderone | H01M 2/0404 |
| | | | | 429/50 |
| 2010/0097211 | A1* | 4/2010 | Silver | G08B 29/181 |
| | | | | 340/540 |
| 2011/0133571 | A1 | 6/2011 | Kiyohara et al. | |
| 2012/0025771 | A1 | 2/2012 | Bhardwaj et al. | |
| 2012/0319658 | A1 | 12/2012 | White et al. | |

OTHER PUBLICATIONS

International Preliminary Report on Patentability in the International Application No. PCT/US2014/013832 issued Aug. 4, 2015, all enclosed pages cited.

* cited by examiner

BATTERY PACK INTERFACE SYSTEM

TECHNICAL FIELD

Example embodiments generally relate to battery pack technology and, more particularly, relate to components of a system designed for intelligent charging and operation of a battery pack.

BACKGROUND

Property maintenance tasks are commonly performed using various tools and/or machines that are configured for the performance of corresponding specific tasks. Certain tasks, like cutting trees, trimming vegetation, blowing debris and the like, are typically performed by hand-held tools or power equipment. The hand-held power equipment may often be powered by gas or electric motors. Until the advent of battery powered electric tools, gas powered motors were often preferred by operators that desired, or required, a great deal of mobility. Accordingly, many walk-behind or ride-on outdoor power equipment devices, such as lawn mowers, are often powered by gas motors because they are typically required to operate over a relatively large range. However, as battery technology continues to improve, the robustness of battery powered equipment has also improved and such devices have increased in popularity.

The batteries employed in hand-held power equipment may, in some cases, be removable and/or rechargeable assemblies of a plurality of smaller cells that are arranged together in series and/or parallel arrangements in order to achieve desired output characteristics. However, when these cells are arranged together to form battery packs, it is important to consider that the battery packs can sometimes be operated in harsh or at least relatively uncontrolled conditions. Exposure to extreme temperatures, dust/debris, moisture and other conditions can present challenges for maintaining performance and/or integrity of battery packs.

To increase the robustness of battery packs that can be used in relatively inhospitable environments, it may be advantageous to provide a seal around the cells of the battery pack to limit their exposure to the environment. Battery cells generate electricity via electrochemical reactions that may generate heat. Thus, sealing of battery packs, while useful in preventing exposure to some harsh conditions, may cause cell heat to be contained so that it builds up and is difficult to dissipate effectively. This may inadvertently create high internal temperatures that could damage cells or negatively impact cell performance. Accordingly, it may be desirable to implement some form of intelligent control over charging and/or discharging of battery packs. A careful and knowledgeable operator may monitor some battery conditions or operational situations to manually control the charge/discharge rates. However, most operators are not knowledgeable enough to maximize battery operational capabilities while minimizing potentially negative impacts, and most operators also do not wish to be burdened with such tasks.

BRIEF SUMMARY OF SOME EXAMPLES

Some example embodiments may provide a system for intelligent management of battery pack charge and discharge operations by creating a smart interface system. Such a smart interface system may include components within charging circuitry, within components that use battery packs, and/or within the battery packs themselves to monitor and/or control various battery pack charging/discharging parameters to generate efficient charge/discharge management. Battery life and operational characteristics may be improved and, in some cases, capabilities for handling battery packs safely at the end of life may also be improved.

In accordance with an example embodiment, a battery charging system may be provided. The battery charging system may include one or more battery packs each of which includes control circuitry and a switching assembly, and a charger including a power section and a charge controller. The charge controller and/or the control circuitry may be configured to direct operation of the switching assembly to control charging of the one or more battery packs.

In another example embodiment, a battery pack for a battery charging system is provided. The battery pack may include control circuitry configured to interface with a charge controller of a charger, and a switching assembly configured to interface between cells of the battery pack and a power section of the charger. The control circuitry may be configured to direct operation of the switching assembly to control charging of the cells of the battery pack.

Some example embodiments may improve the performance and/or the efficacy of battery packs that are used in connection with battery powered equipment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
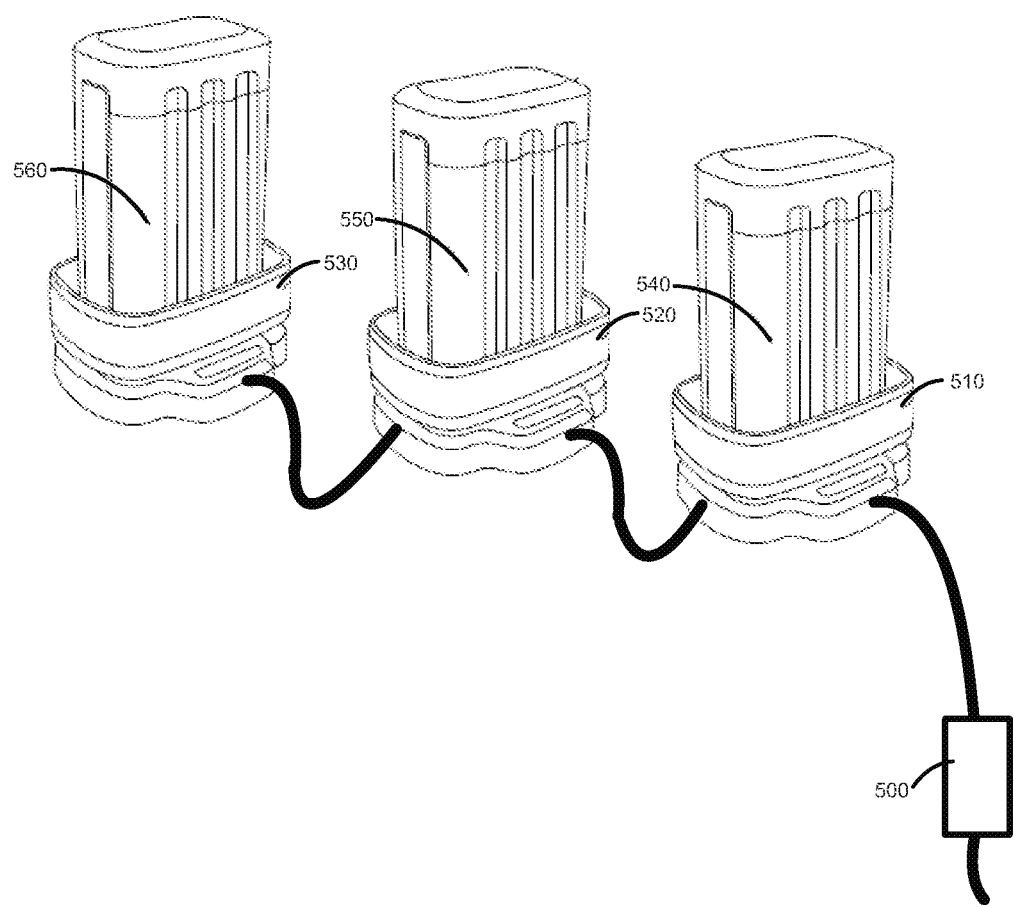
Figure 6A:
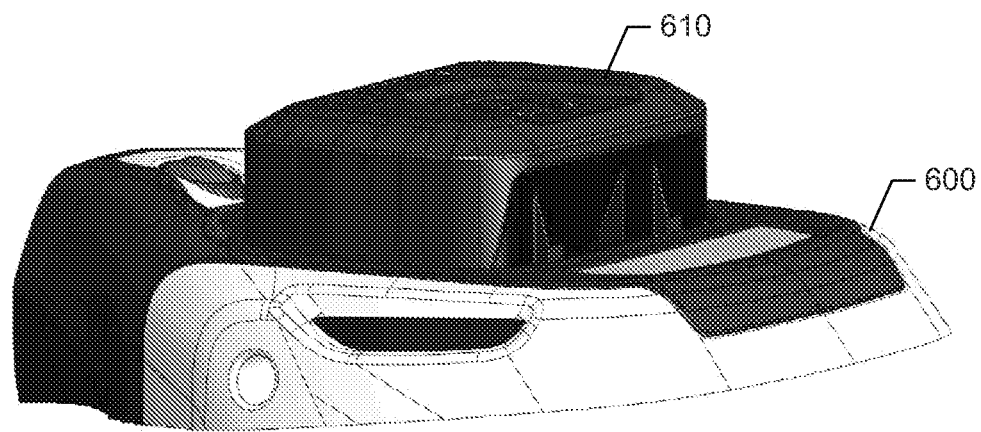
Figure 6B:
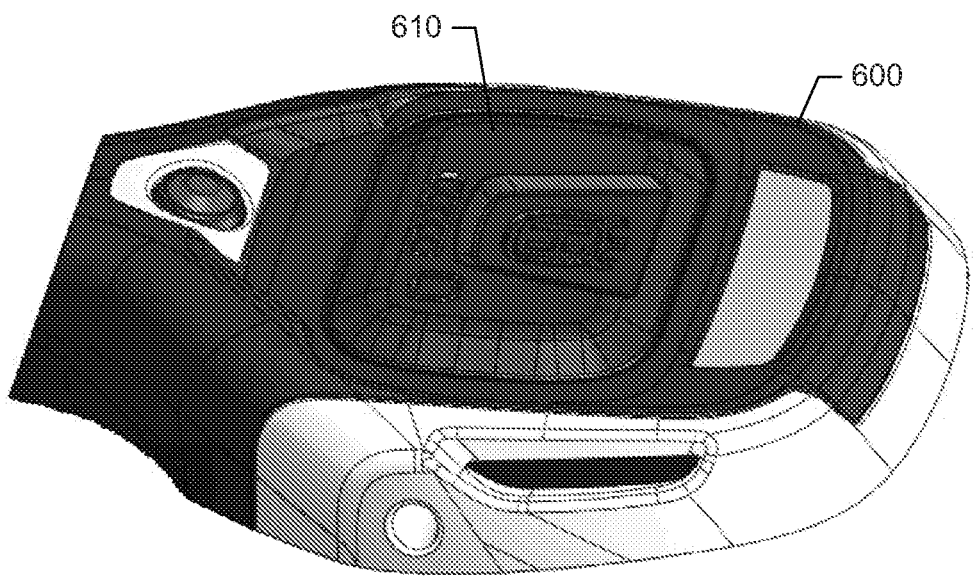

FIG. 5 illustrates charger electronics in a converter box and a series of charger adapters connected to each other via bus connections in accordance with an example embodiment; and FIG. 6, which includes FIGS. 6A and 6B, illustrates a top perspective view of a power tool having a battery pack fully inserted (FIG. 6B) and partially inserted (FIG. 6A) into a receiving cavity of the power tool according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should also be appreciated that some example embodiments may be scaled for use with any desirable number of battery cells. Thus, any illustration or suggestion as to the number of battery cells in any particular example embodiment described herein should be appreciated as a non-limiting example.

Some example embodiments may provide for a battery pack that can be useful in connection with battery powered tools or battery powered outdoor power equipment. Outdoor power equipment that is battery powered, and battery powered tools, typically include battery packs that include a plurality of individual cells. In order to achieve sufficient power, cells are organized and interconnected (e.g., in a series of series and/or parallel connections) to group the cells within a battery pack in a manner that achieves desired characteristics. The battery pack may be inserted into an aperture of the piece of equipment it powers so that the corresponding piece of equipment (e.g., hand-held, ride-on, or walk-behind equipment) is enabled to be mobile. However, in some cases, the battery pack may be inserted into a backpack or other carrying implement that the equipment operator may wear.

The cells of the battery pack are often rechargeable, cylindrical shaped cells. However, cells with other shapes, and even replaceable batteries could alternatively be employed in other embodiments. Given that the batteries produce energy via electrochemical reactions that generate heat, the battery pack may tend to heat up during charging or discharging operations. In particular, when the equipment operated by the battery pack is working hard, the discharge rates may be high. Similarly, when the battery pack is being charged, the rate of charging may impact heat generation. In this regard, for example, if the battery pack is to be charged quickly, and therefore have a relatively high rate of charge, the battery pack may generate a relatively large amount of heat.

Figure 1:
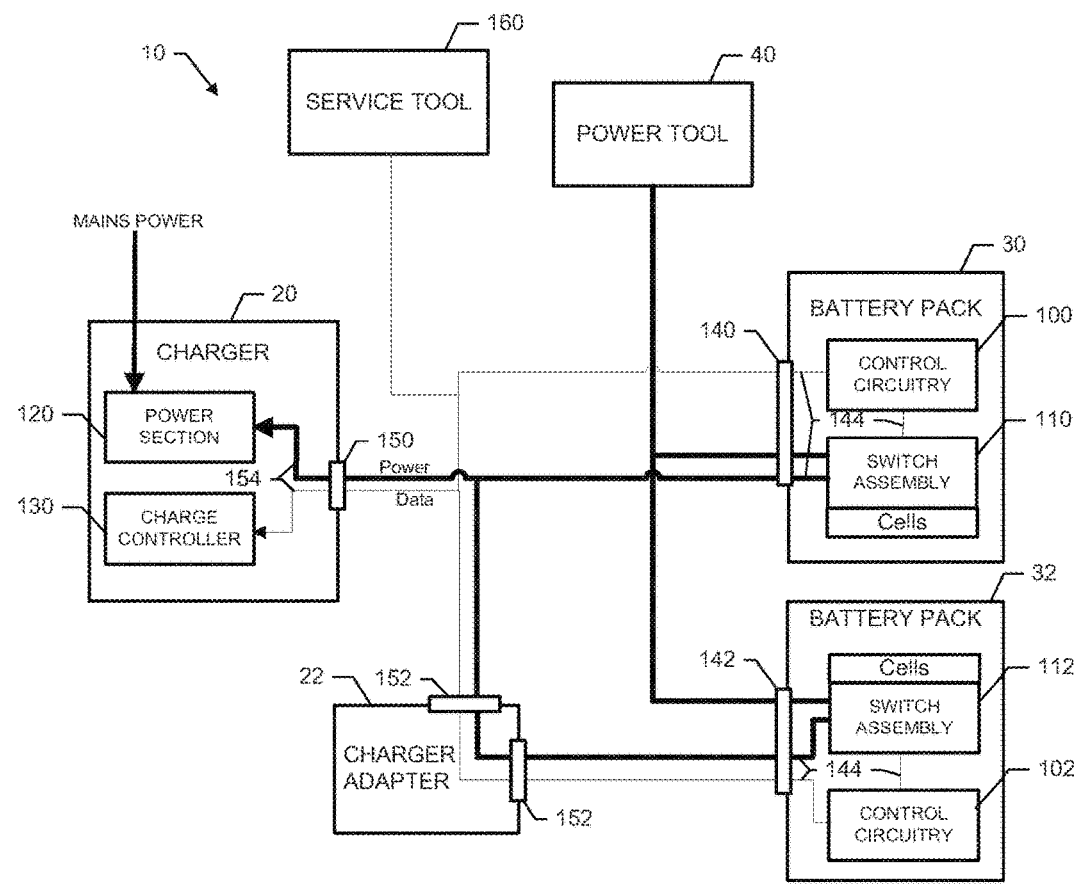
FIG. 1 illustrates a block diagram of a system in which various components for improving the operational performance of battery packs while charging and/or discharging is performed according to an example embodiment.

Example embodiments may provide a system of components that can operate independently or interact with each other to improve battery pack performance. FIG. 1 illustrates a block diagram of a system 10 in which various components for improving the operational performance of battery packs while charging and/or discharging is performed. In this regard, the system 10 includes a charger 20, a charger adapter 22, a first battery pack 30, a second battery pack 32, and a power tool 40. In an example embodiment, the power tool 40 may be a battery operated device such as, for example, a trimmer, edger, chainsaw, riding lawn mower, walk behind lawn mower, or other power tool that may employ a working assembly for performing a task responsive to operation of an electric motor that can be battery powered. In some cases, the first and second battery pack 30 and 32 may be provided within a backpack to power the power tool 40.

Notably, although FIG. 1 illustrates two battery packs (e.g., the first and second battery packs 30 and 32) and two charging devices (e.g., the charger 20 and the charger adapter 22), it should be appreciated that example embodiments may also operate with only a single battery pack and charger, or with more than two battery packs and chargers. Thus, the two battery packs and chargers of FIG. 1 are simply used to illustrate a potential for operation with respect to a multiplicity of battery packs and chargers the specific number of battery packs and chargers shown in FIG. 1 is in no way limiting to other example embodiments. Furthermore, in some embodiments, a single charging device may be directly connected to multiple battery packs so that an adapter is not needed.

In some embodiments, the system 10 may also work in connection with multiple different power tools. Thus, the power tool 40 is merely one example of a battery powered piece of equipment that may use one of the battery packs of FIG. 1. Accordingly, example embodiments are scalable to inclusion of any number of devices being tied into the system 10. Moreover, it should be appreciated that the interconnections shown in FIG. 1 are merely illustrative of the potential for interconnection, and do not necessarily reflect the existence of a live connection or a permanent connection and any particular instant in time. Instead, each interconnection shown in FIG. 1 should be understood to illustrate the potential for connection of the battery packs to the power tool while charging, the potential for charging the battery packs without the power tool 40 connected, or the potential for operating the power tool with one or more of the battery packs when the charger is disconnected. Thus, for example, the system 10 may operate with each device (i.e., the charger 20, the charger adapter 22, the first and second battery packs 30 and 32, and the power tool 40) disconnected from the system 10 or with just selected ones of the devices connected to the system 10. As such, it should be appreciated that the architecture of various example embodiments may vary. Thus, the example structure of FIG. 1 is merely provided for ease of explanation of one example embodiment and should not be considered to be limiting with respect to the architecture of the system 10.

In an example embodiment, each of the first and second battery packs 30 and 32 may be configured to house a plurality of battery cells (not shown). The cells may employ Lithium ion, Nickel Cadmium, or any other suitable battery chemistry for storing and delivering power via rechargeable battery cells. The battery cells may be cylindrically shaped cells that are inserted into adjacent cell reception slots disposed in a cell retainer to hold the cells such that the longitudinal centerlines of each cell are parallel to each other while the respective longitudinal ends of the cells lie in respective parallel planes. A housing may surround all of the battery cells and internal circuitry may be provided to connect the cells with each other in parallel and/or in series. In an example embodiment, the internal circuitry of each of the first and second battery packs 30 and 32 may include control circuitry and smart switch components.

As shown in FIG. 1, the first battery pack 30 may include control circuitry 100 and the second battery pack 32 may include control circuitry 102. The first battery pack 30 may also include smart switch components for the activation of one or more functionalities described herein via operation of corresponding one or more switches that have positions controlled by the control circuitry 100. In an example embodiment, the smart switch components of the first battery pack 30 may be referred to as a switch assembly 110. Similarly, the second battery pack 32 may include a switch assembly 112 that operates under the control of control circuitry 102. As can be appreciated from FIG. 1, if additional battery packs were provided, each such battery pack may also include its own instance of control circuitry and switch assembly.

In an example embodiment, the switch assemblies 110 and 112 and the control circuitry 100 and 102 of the first and second battery packs 30 and 32, respectively, may be in communication with a power section 120 and a charge controller 130 of the charger 20. The power section 120 may include power conversion and/or regulation circuitry for receiving AC mains power and converting the AC mains power to a regulated DC voltage output for provision to the first and second battery packs 30 and 32. The charge controller 130 may include circuitry for controlling operation of the power section 120 and/or for communication with the control circuitry 100/102 of the first and second battery packs 30 and 32, respectively. Thus, for example, the charge controller 130 may include instructions for controlling the switch assemblies 110/112 of the first and second battery packs 30 and 32, respectively, via communication with the control circuitry 100/102 of the first and second battery packs 30 and 32.

In some embodiments, the first battery pack 30 may be directly connected to the charger 20, but the second battery pack 32 may be indirectly connected to the charger 20 via the charger adapter 22. Thus, for example, the charger adapter 22 of some embodiments need not necessarily include a power section or a charge controller. Instead, the charger adapter 22 may merely provide an interface platform by which to pass power and/or control signals from the charger 20 to additional battery packs.

In an example embodiment, the first and second battery packs 30 and 32 may each include a communications interface (e.g., communications interfaces 140 and 142, respectively) that may be formed via one or more electrical contacts connected to internal circuitry of a data and power interface bus 144. The data and power interface bus 144 may include data runs or wires that connect the control circuitry 100/102 to the switch assemblies 110/112 and to the communication interfaces 140 and 142, respectively. The data and power interface bus 144 may also include power runs or wires that connect the communication interfaces 140 and 142 to the switch assemblies 110/112.

The charger 20 and the charger adapter 22 may each also include respective communication interfaces 150 and 152, which may be formed via one or more electrical contacts connected to internal circuitry of a data and power interface bus 154. The data and power interface bus 154 may include data runs or wires that connect the charge controller 130 to the communication interface 150 of the charger 22 and that provide a pass through of data between communication interfaces 152 of the charger adapter 22. The data and power interface bus 154 may also include power runs or wires that connect the power section 120 to the communication interface 150 of the charger 22 and that provide a pass through of power between communication interfaces 152 of the charger adapter 22. When the one or more electrical contacts of the communications interfaces 140 and 142 are in contact with the corresponding one or more electrical contacts of the communication interfaces 150 and 152, respectively, data and/or power may be passed between the buses 144 and 154. When the first and/or second battery packs 30/32 are connected to the power tool 40, and disconnected from the charger 20 and the charger adapter 22, electrical contacts of the power tool 40 may communicate with the communication interfaces 140 and 142 so that power can be provided from the first and/or second battery packs 30/32 to the power tool 40 to provide electrical power for operation of the power tool 40.

In some embodiments, a diagnostic tool (e.g., service tool 160) may be capable of being connected to the data bus portion of the busses 144 and 154. The service tool 160 may be configured to monitor the data bus for the performance of diagnostic functions and, in some cases, also provide instructions or actuate certain functionalities when a particular stimulus is detected. For example, in cases in which an end of life circuit (e.g., see end of life circuit 350 in FIG. 3A below) is employed, the service tool 160 may be utilized by an operator or responsive to detection of criteria that support actuation of the end of life circuit to cause the end of life circuit to be activated.

Figure 2:
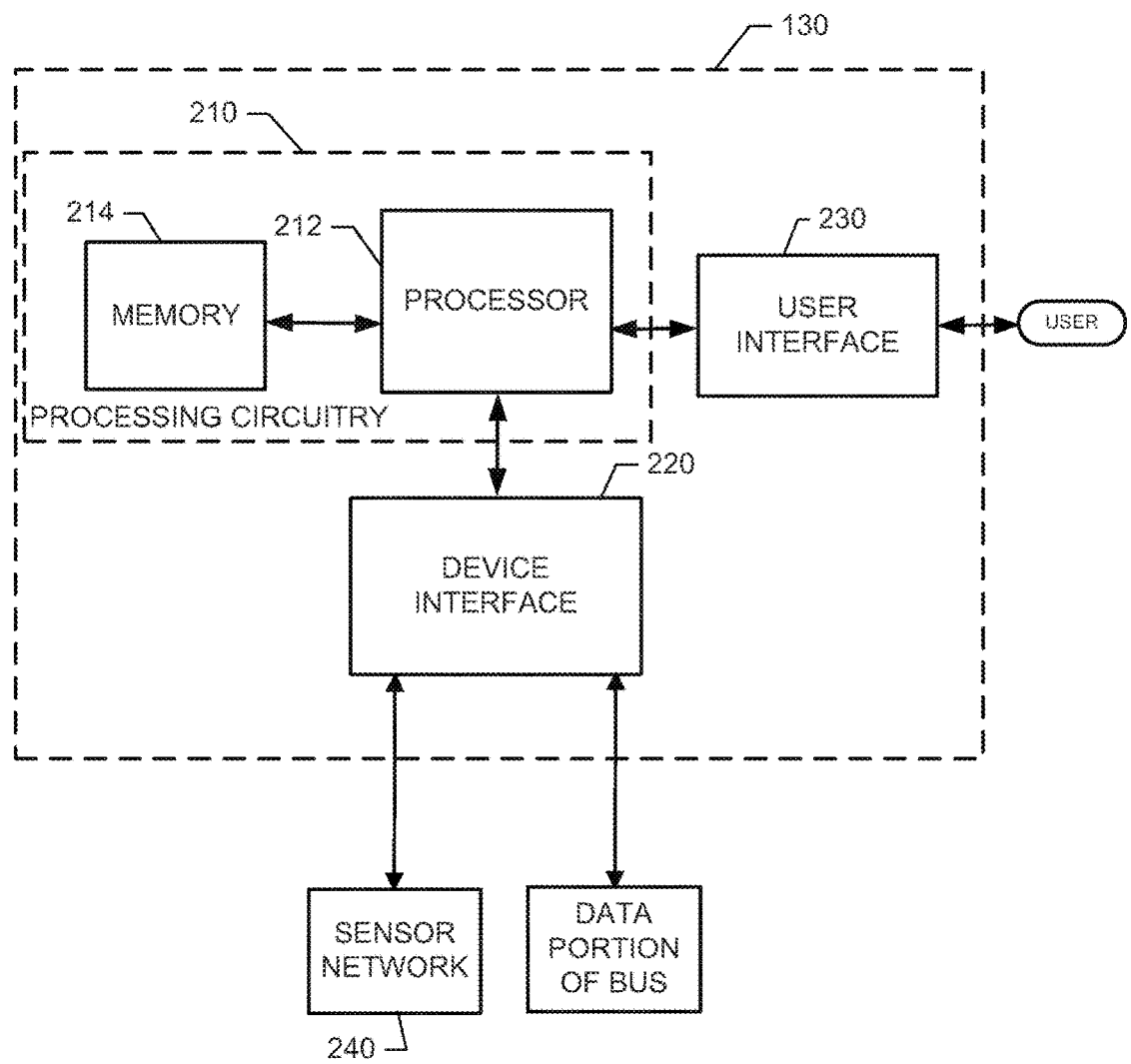
FIG. 2 illustrates a more detailed block diagram of a charge controller of the charger of FIG. 1 according to an example embodiment.

FIG. 2 illustrates a more detailed block diagram of the charge controller 130 of the charger 20 according to an example embodiment. As shown in FIG. 2, the charge controller 130 may include processing circuitry 210 of an example embodiment as described herein. In this regard, for example, the charge controller 130 may utilize the processing circuitry 210 to provide electronic control inputs to one or more functional units of the charger 20 and/or the first and second battery packs 30 and 32 (e.g., the control circuitry 100/102 and/or the switching assembly 110/112) and to process data generated by the one or more functional units regarding various operational parameters relating to the charger 20 and/or the first and second battery packs 30 and 32. In some cases, the processing circuitry 210 may be configured to perform control function execution and/or other processing and management services according to an example embodiment of the present invention.

In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of a sensor network 240 (e.g., sensors that measure parameters of the charger 20, charger adapter 22 and/or the first and second battery packs 30 and 32) via the device interface 220. In one embodiment, part of the sensor network 240, or at least a component or assembly of components with which the processing circuitry 210 may communicate, may include any or all of temperature sensors, current sensors, voltage sensors and/or the like.

The sensor network 240 may be configured to provide indications of parameters of the first and second battery packs 30 and 32 to the charge controller 130 to enable the charge controller 130 to provide instructions or commands to the control circuitry 100/102 for operation of the switch assemblies 110/112 based on data provided via the data and power interface buses 144 and 154. Some of the control instructions or commands and corresponding functionalities that are achievable in connection with example embodiments are described elsewhere herein.

The user interface 230 may be in communication with the processing circuitry 210 to receive an indication of a user input at the user interface 230 and/or to provide an audible, visual, tactile or other output to the user. As such, the user interface 130 may include, for example, a display, one or more levers, switches, buttons or keys (e.g., function buttons), and/or other input/output mechanisms. In an example embodiment, the user interface 230 may be used by the operator to define settings, operational modes or other criteria to impact operation of the charge controller 130 or components operably coupled thereto.

The device interface 220 may include one or more interface mechanisms for enabling communication with other devices (e.g., sensors of the sensor network 240 or other functional units or power equipment in connection with which an example embodiment may be employed). In some cases, the device interface 220 may be any means such as a device or circuitry embodied in either hardware, or a combination of hardware and software that is configured to receive and/or transmit data from/to sensors in communication with the processing circuitry 210.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of the charge controller 130 based on inputs received by the processing circuitry 210 responsive to operation of the charger 20 and/or the operation of various ones of any functional units that may be associated with the system 10. As such, in some embodiments, the processor 212 (or the processing circuitry 210) may be said to cause each of the operations described in connection with the charge controller 130 in relation to operation the charge controller 130 relative to undertaking the corresponding functionalities associated therewith responsive to execution of instructions or algorithms configuring the processor 212 (or processing circuitry 210) accordingly.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative or additional capability, the memory 214 may include one or more databases that may store a variety of data sets responsive to input from the sensor network 240 or any other functional units that may be associated with the system 10. Among the contents of the memory 214, applications may be stored for execution by the processor 212 in order to carry out the functionality associated with each respective application. In some cases, the applications may include instructions for recognition of various input conditions related to charge/discharge of the first and second battery packs 30 and 32 and then providing instructions for control of the switch assemblies 110/112 as described herein. Thus, in some embodiments, the charge controller 130 may direct operation of the switch assemblies 110/112 in order to direct sequential or simultaneous charging of multiple battery packs that may be connected to the charger directly or indirectly via charger adapters.

Figure 3A:
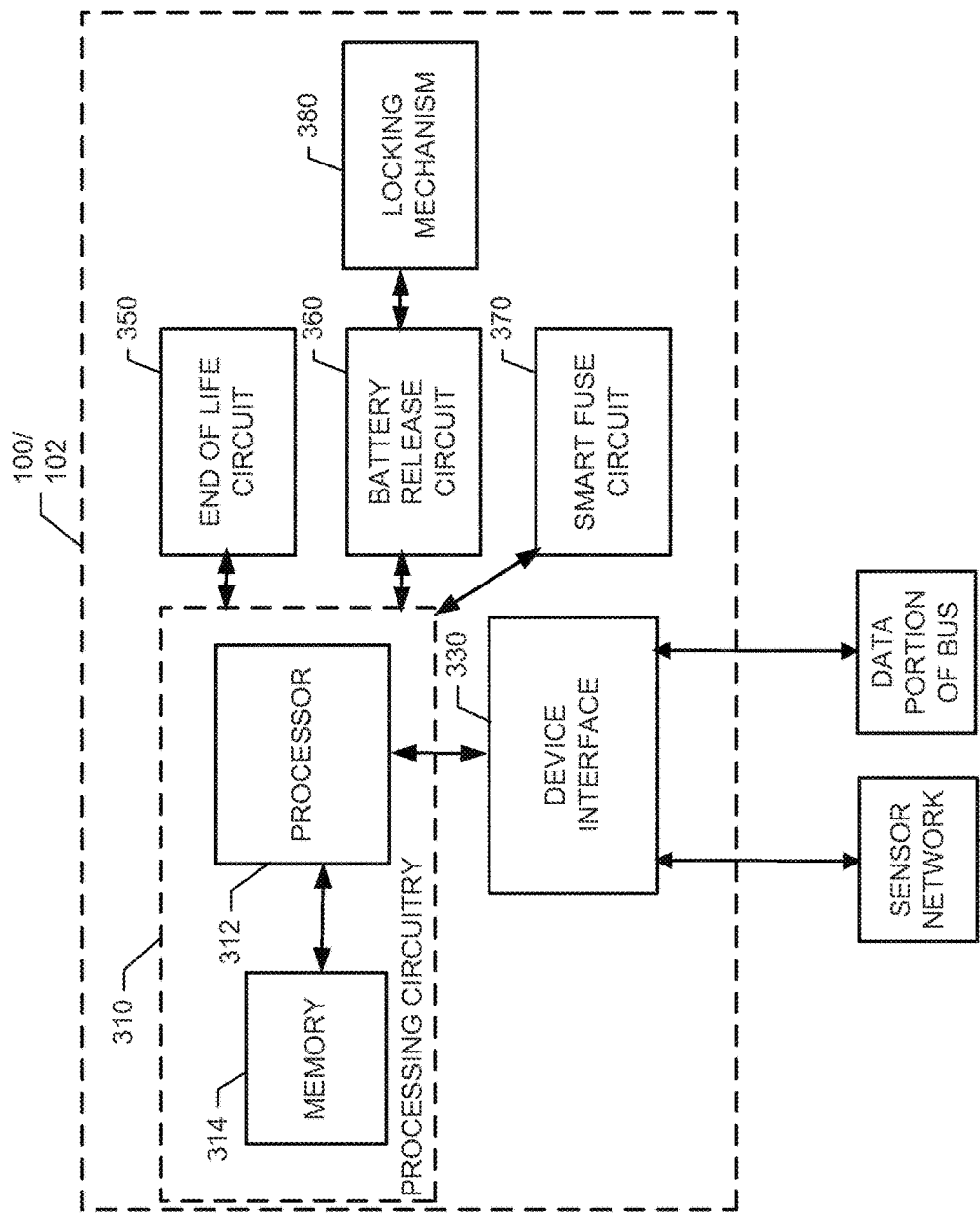
FIG. 3A illustrates a more detailed block diagram of control circuitry that may be employed within either or both of the first and second battery packs shown in FIG. 1 according to an example embodiment.

FIG. 3A illustrates a more detailed block diagram of the control circuitry 100/102 of the first and second battery packs 30 and 32 according to an example embodiment. As shown in FIG. 3A, the control circuitry 100/102 may include processing circuitry 310 of an example embodiment as described herein. In this regard, for example, the control circuitry 100/102 may utilize the processing circuitry 310 to provide electronic control inputs to one or more functional units of the first and second battery packs 30 and 32, to respond to instructions from the charge controller 130 and/or to process data generated by the one or more functional units regarding various operational parameters relating to the first and second battery packs 30 and 32, respectively. In some cases, the processing circuitry 310 may be configured to perform control function execution and/or other processing and management services according to an example embodiment of the present invention including providing instructions for operation of the switch assemblies 110/112.

In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. The processor 312, the memory 314 and the device interface 320 may be similar in form and function to the processor 212, the memory 214 and the device interface 220 of FIG. 2, so a detailed description of these components will not be repeated.

In some embodiments, the processing circuitry 310 may communicate with electronic components and/or sensors of a sensor network 340 (e.g., sensors that measure parameters of the first and second battery packs 30 and 32, which may be the same, different or a portion of sensor network 240) via the device interface 320. In one embodiment, part of the sensor network 340, or at least a component or assembly of components with which the processing circuitry 310 may communicate, may include any or all of temperature sensors, current sensors, voltage sensors and/or the like. Thus, for example, the processing circuitry 310 may be configured to provide diagnostic functionality that is executable based on the processing of sensor network 340 or other data accessed by the processing circuitry 310.

The sensor network 340 may be configured to provide indications of parameters of the first and second battery packs 30 and 32 to the control circuitry 100/102 to enable the control circuitry 100/102 to provide instructions or commands to the switch assemblies 110/112. In an example embodiment the switch assemblies 110/112 may include one or more interface mechanisms for enabling the continuation, performance or stopping of execution of various functionalities based on switch positions of specific functional components or portions of the switch assemblies 110/112. In this regard, for example, the switch assemblies 110/112 of one embodiment may include an end of life circuit 350, a battery release circuit 360, and/or a smart fuse circuit 370. Each of the end of life circuit 350, the battery release circuit 360, and the smart fuse circuit 370 may be any means such as a device or circuitry embodied in either hardware, or a combination of hardware and software that is configured to perform switching functions either with actual physical switches that are microprocessor controlled or with software/hardware control functionality that functions similar to a switch to control functionalities as described herein.

The end of life circuit 350 may be used to terminate operability of the battery pack in which it is instantiated responsive to activation of the end of life circuit 350. In this regard, for example, the diagnostic function of the processing circuitry 310 may identify a situation (or have such situation identified for it by the processing circuitry 210 of the charge controller 130) which requires that operation of the battery pack be terminated. The end of life circuit 350 may, responsive to actuation thereof by the processing circuitry 310, operate a physical switch or may otherwise adjust an operating state of the battery pack in which it is located to disable the operation of the battery pack. In some embodiments, the end of life circuit 350 may melt or otherwise open a fuse or link, or actuate a switch to isolate the battery cells of the battery pack from the output terminals of the battery pack (e.g., communications interfaces 140 and 142) by opening contacts proximate to the output terminals or along a length of bus work leading to the output terminals. However, in other instances, a switch may be activated to open circuit the battery cells proximate to the battery cells themselves. In still other examples, a switch position may be shifted to align the battery cells to discharge through a dummy load that may form a portion of the end of life circuit 350. By discharging the battery cells through the dummy load, it may be ensured that the battery pack is not transported, stored, or evaluated while still having a charge with a potential fault condition in place. The dummy load may employ any desirable size of resistor or resistance network that is deemed appropriate to achieve the discharge characteristics desired.

In some embodiments, activation of the end of life circuit 350 may further cause activation of a status indicator or flag to inform the operator of a status change for the battery (e.g., to a disabled status). The status indicator may reside locally at the corresponding battery pack, or may be read out at the user interface 230 of the charger 20. The status indicator may inform the operator of the existence of a fault that triggered activation of the end of life circuit 350 or of the fact that the battery pack has reached the end of life. Additionally or alternatively, the status indicator or other indications or data relating to battery condition may be read out from the processing circuitry 310 of the battery using a diagnostic tool. The processing circuitry 310 may be configured to record (e.g., in the memory 314) battery parameters and/or events associated with changes in battery parameters that may be responsible for activation of the end of life circuit 350.

In some example embodiments, the end of life circuit 350 may initially function to isolate the battery cells (and/or discharge them) until evaluation can be accomplished. Thereafter, if evaluation of a battery pack that determines that the battery pack is faulty, defective or otherwise should be disposed of, the end of life circuit 350 may be manually operated to permanently discharge and/or disable the battery pack.

Accordingly, example embodiments may employ a microprocessor controlled diagnostic functionality for further enabling microprocessor controlled discharge, deactivation (temporarily or permanently) and/or notification of battery fault conditions and/or end of life conditions. Thus, for example, when battery voltage dips below a threshold, the end of life circuit 350 may be used to notify the operator that the battery pack needs recharging or replacement. If battery current or temperature increases or spikes above a given threshold (in some cases for a given period of time), the end of life circuit 350 may activate to protect the battery pack. Additionally or alternatively, the end of life circuit 350 may be activated to discharge or otherwise isolate battery cells to make the battery pack safer for transport, disposal and/or evaluation.

In embodiments that employ the battery release circuit 360, the battery release circuit 360 may be employed to initiate a microprocessor controlled detachment of the battery pack from the power tool 40 (e.g., an electric release). Accordingly, for example, the battery release circuit 360 may include a locking mechanism 380 that is released by microprocessor control when operated by the operator and/ or when certain detectable conditions necessitate such release. The battery release circuit 360 may therefore interact with the locking mechanism 380 to release the locking mechanism 380 and, in some cases, eject the battery pack.

In an example embodiment, the locking mechanism 380 may include a linear or rotary actuator such as an electric motor (e.g., powered by the battery pack itself), solenoid, or other series of microprocessor controlled mechanical linkages (e.g., spring loaded discharge mechanisms that are prevented from operation by a retaining rod or linkage). The locking mechanism 380 may therefore operate to either prevent ejection of the battery pack until the locking mechanism 380 is released (e.g., by activation of the battery release circuit 360) or to cause ejection of the battery pack by physically moving the battery pack out of contact with the tool (or charging device) responsive to operation of the battery release circuit 360.

Figure 3B:
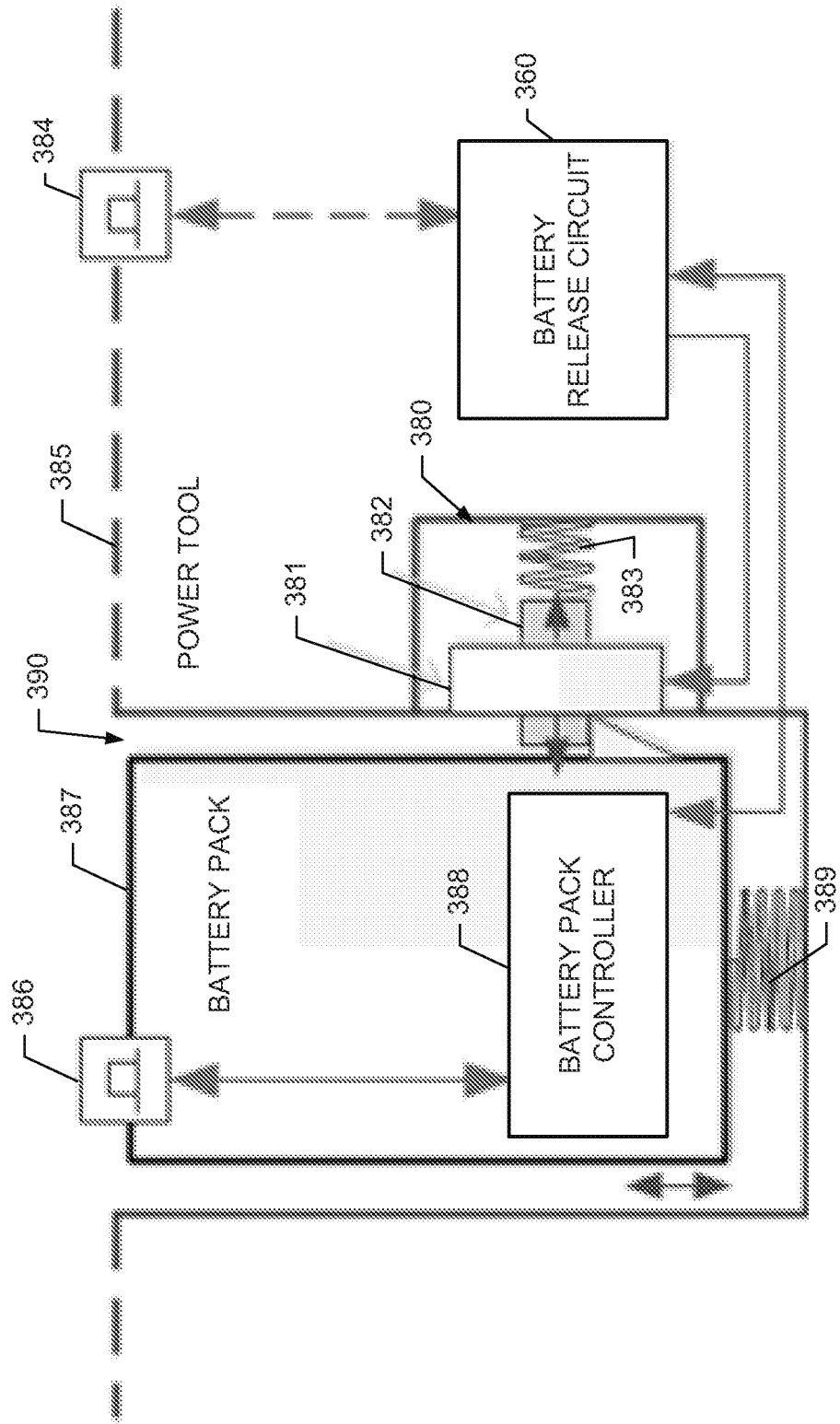
FIG. 3B illustrates a more detailed block diagram of a battery release circuit and locking mechanism that may be employed according to an example embodiment.

FIG. 3B illustrates a more detailed block diagram of a battery release circuit and locking mechanism that may be employed according to an example embodiment. In this regard, the locking mechanism 380 includes a solenoid 381 (or motor) and a locking rod 382 that is biased by a spring 383. Operation of the solenoid 381 responsive to instruction from the battery release circuit 360 may cause the locking rod 382 to be released or engaged. In one embodiment, operation of the solenoid 381 may cause the locking rod 382 to be withdrawn against the bias of the spring 383. Thereafter, when the solenoid 381 is not actuated, the spring 383 may cause the locking rod 382 to be urged toward engagement with the battery pack 385.

In some embodiments, the battery release circuit 360 may operate responsive to operator actuation of a release button 384 disposed on the device being powered (e.g., power tool 385). However, in some alternatives, a battery pack release button 386 may be provided on the battery pack 387. When the operator actuates the battery pack release button 386, a battery pack controller 388 may provide a signal to the battery release circuit 360 in the power tool 385 to cause the locking mechanism 380 to operate to release the locking rod 382 from engagement with the battery pack 387. An ejection spring 389 may then urge the battery pack 387 out of the reception orifice 390 of the power tool 385. Accordingly, while the release mechanism may reside in the power tool 385, the user interface for actuating the release mechanism could be on the battery pack 387 or on the power tool 385.

A typical battery pack may be held in place against a biasing force that tends to push the battery pack out of contact with its charging device or power tool. Thus, for example, the typical battery pack may be held in place by a mechanical release mechanism that may be physically moved by the operator to release a detent or clamping mechanism to allow a spring to separate battery contacts from charging device or power tool contacts. However, this type of mechanical release mechanism may be inadvertently operated by the operator to cause an undesirable (and perhaps uncontrolled) release of the battery pack from a tool that could even be in operation. To reduce the likelihood of an inadvertent release, some battery packs may require simultaneous operation of two mechanical release levers or mechanisms. However, even these can be inadvertently operated.

The battery release circuit 360 may employ electronic (e.g., microprocessor) controlled release so that further functionality may be implemented to prevent inadvertent release. In this regard, for example, the battery release circuit 360 may employ electronic control of the locking mechanism 380 so that certain inadvertent release prevention functions may be employed. For example, the battery release circuit 360 may not be enabled while the power tool 40 is operating. Thus, an electronic interlock may prevent operation to release the locking mechanism 380 unless the power tool 40 is not in operation. However, in some cases, the battery release circuit 360 may initiate operation of the locking mechanism 380 to cause ejection or disconnection of the battery pack from the power tool 40 if, for example, a fault condition is detected. Thus, for example, if the diagnostic function of the processing circuitry 310 has indications of overheating or overcurrent conditions in the battery pack, the battery release circuit 360 may be actuated to release the locking mechanism 380 so that further operation of the battery pack can be stopped.

In an example embodiment, actuation of the battery release circuit 360 may be triggered responsive to overheating of a fuse or link that triggers actuation of the locking mechanism 380 to release the battery pack. Tool status may also be a basis upon which the battery is prevented from being removed, or for which removal is facilitated for certain status conditions (e.g., active, inactive, operating, etc.). Thus, any of a number of other electronic interlocks may also trigger operation of the battery release circuit 360, or prevent operation thereof. As an example, in some cases the interlocks may operate to remove the battery when high temperature or current conditions are sensed. However, in other cases, interlocks may function to prevent battery removal when the tool is in operation or being held at certain orientations (e.g., at an orientation which could lead to the battery falling).

In some cases, the actuation of the locking mechanism 380 may cause a solenoid or motor to move the battery pack so that electrical contacts are broken. Thus, in some cases the electrical contacts may be required to be maintained sufficiently to power the locking mechanism 380 at least until the electrical contact between the power tool 40 and the battery pack is broken. As such, for example, the connector powering any motor for pushing the battery pack out of contact with the power tool 40 may actually follow the battery pack during movement until the contact with the power tool 40 is broken after which time the contact between the battery pack and the motor may also break to secure operation of the motor.

In some embodiments, in addition to or as an alternative to employing certain electronic interlocks, a specific actuation sequence may be required to activate the battery release circuit 360. For example, a button may be provided that must be pushed or actuated twice (or some other number of times) in order to activate the battery release circuit 360. Feedback may be provided after the first actuation to let the operator know that the next actuation will cause the unlocking mechanism 380 to be operated. As an alternative, a single steady push or actuation of a button for actuation may cause triggering of the unlocking mechanism 380. In some cases, the steady push may be held a first period of time to trigger feedback to indicate that further holding a second period of time will cause triggering of the unlocking mechanism 380. The feedback may be provided visibly (e.g., via an LED light), audibly (e.g., via one or more beeps or buzzes), or tactilely (e.g., via vibration).

In an example embodiment, the smart fuse circuit 370 may be provided to enable protective functions to be performed under microprocessor control (e.g., via the processing circuitry 310). The smart fuse circuit 370 may provide a power input/output interface that is controllable externally (e.g., via the control circuitry 100/102 and/or the charger controller 130. The power input/output interface of the smart fuse circuit 370 may allow power to enter the smart fuse circuit 370 via the power portion of the data and power interface bus 144. However, power may be selectively output from the smart fuse circuit 370 based on control provided by the processing circuitry 310. Accordingly, for example, the smart fuse circuit 370 may include internal (i.e., relating to interconnections between cells in one battery pack) and/or external (i.e., relating to interconnections between battery packs) switches that are actuated to control output power from the smart fuse circuit 370 based on microprocessor control.

In some embodiments, the smart fuse circuit 370 may enable multiple batteries (e.g., the first and second battery packs 30 and 32) to be selectively employed simultaneously (in series or in parallel) or sequentially for discharge or charging operation. In such an example, the control circuitry 100/102 may interface with the power tool 40 to determine tool specifications or identity and the control circuitry 100/102 may adjust the configuration of the smart fuse circuit 370 to arrange the first and second battery packs 30 and 32 electrically in a desired manner while both the first and second battery packs 30 and 32 are installed in or otherwise operably coupled to the power tool 40. As an alternative, the control circuitry 100/102 may interface with the charger 20 (and/or charger adapter 22) to determine and adjust the configuration of the smart fuse circuit 370 to arrange the first and second battery packs 30 and 32 electrically in a desired manner so that the first and second battery packs 30 and 32 can be charged either sequentially or simultaneously.

In an example embodiment, the smart fuse circuit 370 may also be configured to operate internal switches to isolate battery cells (or groups of cells) when a respective one of the first and second battery packs 30 and 32 are not in use. Thus, for example, an attempt (inadvertently or otherwise) to short circuit the battery terminals will not short circuit the battery cells.

In some embodiments, the smart fuse circuit 370 may be configured to provide selective switch activation based on battery operational parameters (e.g., voltage, temperature and/or current) to isolate the battery pack, individual cells or groups of cells based on detection of fault conditions. Thus, for example, the smart fuse circuit 370 may provide a microprocessor controlled protective function such that functions typically performed by fuses prefabricated to melt or otherwise open at specific values can instead be replaced with switches programmed to operate at specific values. The values may therefore be adjustable based on operator selection of desired protection values (e.g., via the user interface 230). The programming of switch values may be performable either at one specific time or at any desirable time over the life of the battery packs. In some cases, measureable conditions or operating status information may automatically trigger shifts in smart fuse switch activation values. For example, when the power tool 40 is operating in a normal discharge mode, the switches may be activated at a first set of values, but if the power tool 40 is operating in a high discharge mode, the activation values may be increased for the smart fuse circuit 370. In some cases, different values may also be assigned for charging operations. Accordingly, in some cases, the control circuitry 100/102 may receive information from the power tool 40 or from the charger 20 to indicate the specific activation values to employ based on the current discharge or charge related mode of operation of the power tool 40 or the charger 20. Furthermore, in some cases the smart fuse circuit 370 may be further configured to prevent provision of power to the power tool 40 or prevent charging from the charger 20 in situations where either the power tool 40 or the charger 20 is not an approved or proper device for interaction with the first or second battery pack 30 or 32.

In an example embodiment, the smart fuse circuit 370 can be used to initiate battery pack segmentation to effectively reduce the classification of the battery. In this regard, for example, the smart fuse circuit 370 may isolate specific groups of cells to reduce the overall size of the battery to instead effectively create several smaller sized batteries (e.g., less than 100 Wh). This segmentation may reduce battery control requirements for transport of the battery pack.

In some embodiments, the smart fuse circuit 370 may enhance product safety by causing isolation of one or more portions of the battery pack, or the entirety of the battery pack, on the basis of the position of various switches, interlocks or other components of the device powered. Thus, for example, the smart fuse circuit 370 may be controlled based on trigger switch input or any of a number of other switch positions. In some embodiments, inadvertent or erroneous operation of certain electronic modules and/or product components such as the trigger switch or other switches may also trigger smart fuse circuit 370 operation to isolate at least some portion of the battery pack. As such, monitoring of conditions related to electronic functions and/or the position of switches may be used to initiate smart fuse circuit 370 operation.

In some embodiments, the processing circuitry 310 of the battery packs may be employed to provide microprocessor control of charging operations and/or discharging operations via selective activation of the switches of the switch assemblies 110/112 as described above. Programmable or otherwise intelligent protective functions, end of life handling, transport preparation, and controlled battery ejection, all under microprocessor control, may also or alternatively be provided. However, some embodiments may further employ the processing circuitry 310 for intelligent charging operation. In this regard, for example, some embodiments may employ specific charging operational sequences based on parameters that can be measured by sensors. In one example, a two phase charge process may be initiated by the processing circuitry 310 via control of the power application provided to the battery cells. In the first phase, a constant current may be provided until a specific voltage level is achieved. Thereafter, the second phase may include the application of a constant voltage for a period of time until full charge is achieved. The battery itself may therefore be allowed to set charging levels and/or sequences with the introduction of voltage regulation capabilities within the sensor network or control circuitry of the battery pack. The battery chemistry of the battery pack may determine the specific sequences and/or values that are applicable for any given operation.

Figure 4A:
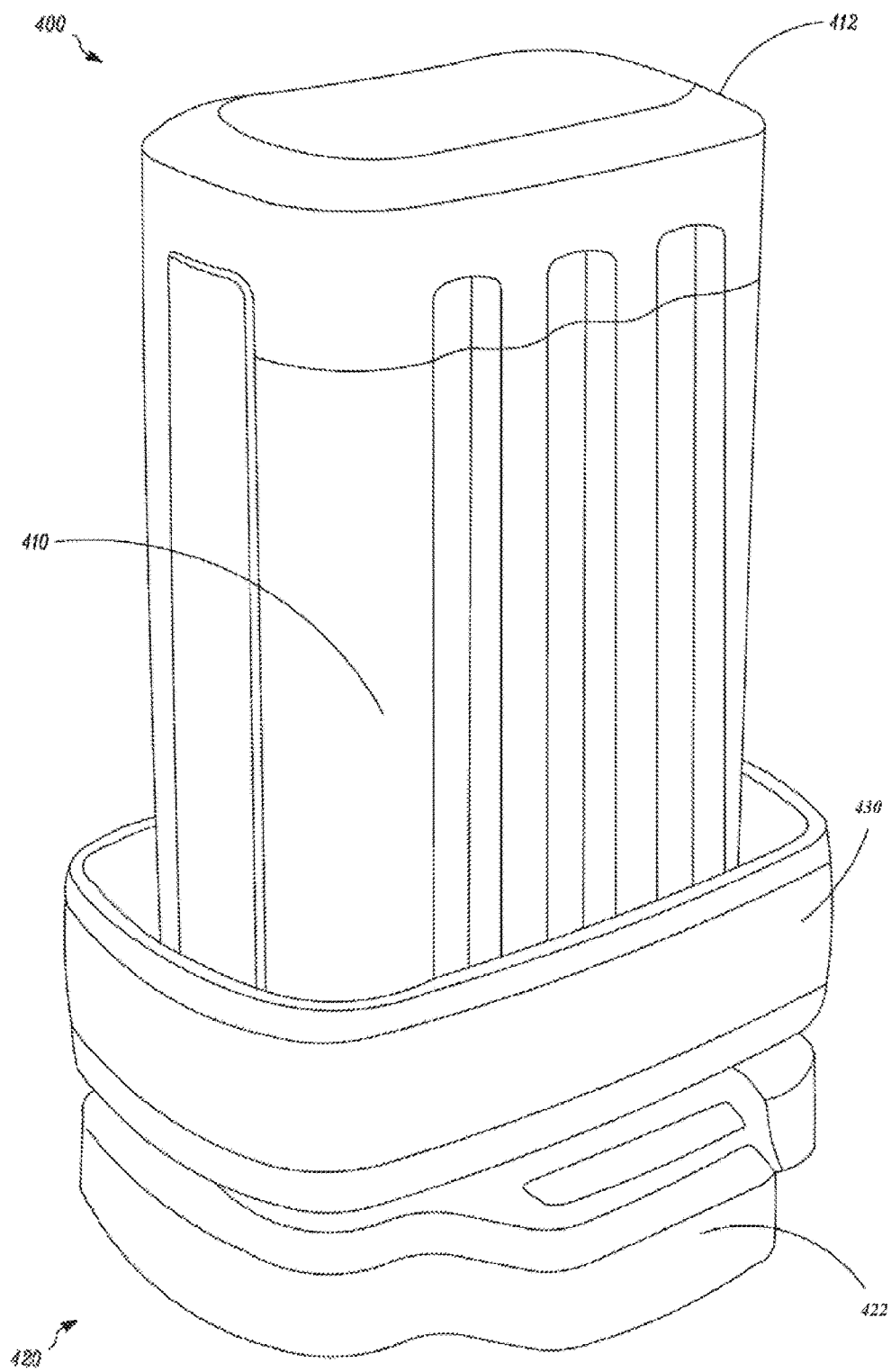
FIG. 4A illustrates one example structure of a charger assembly including a battery pack and a charger that may be employed in connection with an example embodiment.

FIG. 4A illustrates one example embodiment of a charger assembly 400 including a battery pack 410 having a cover top 412. The charger assembly 400 also includes a charger 420 that may be employed in connection with an example embodiment. As can be seen from FIG. 4, the charger 420 may include a charger base 422 that may sit on a flat surface so that one longitudinal end of the battery pack 410 (i.e., the end opposite of the cover top 412) may be inserted into a charger cradle 430 of the charger 420. In some embodiments, the charger base 422 may house the charge controller (e.g., charge controller 130 and/or the power section 120). Moreover, a fan or other cooling components may be provided in the charger base 422 to push air upward around the sides of the battery pack 410. The battery pack 410 may be enabled to be provided into a cavity of a power tool so that the end opposite the cover top 412, which may include the electrical contacts for charge/discharge, is inserted first and the cover top 412 remains exposed.

Figure 4B:
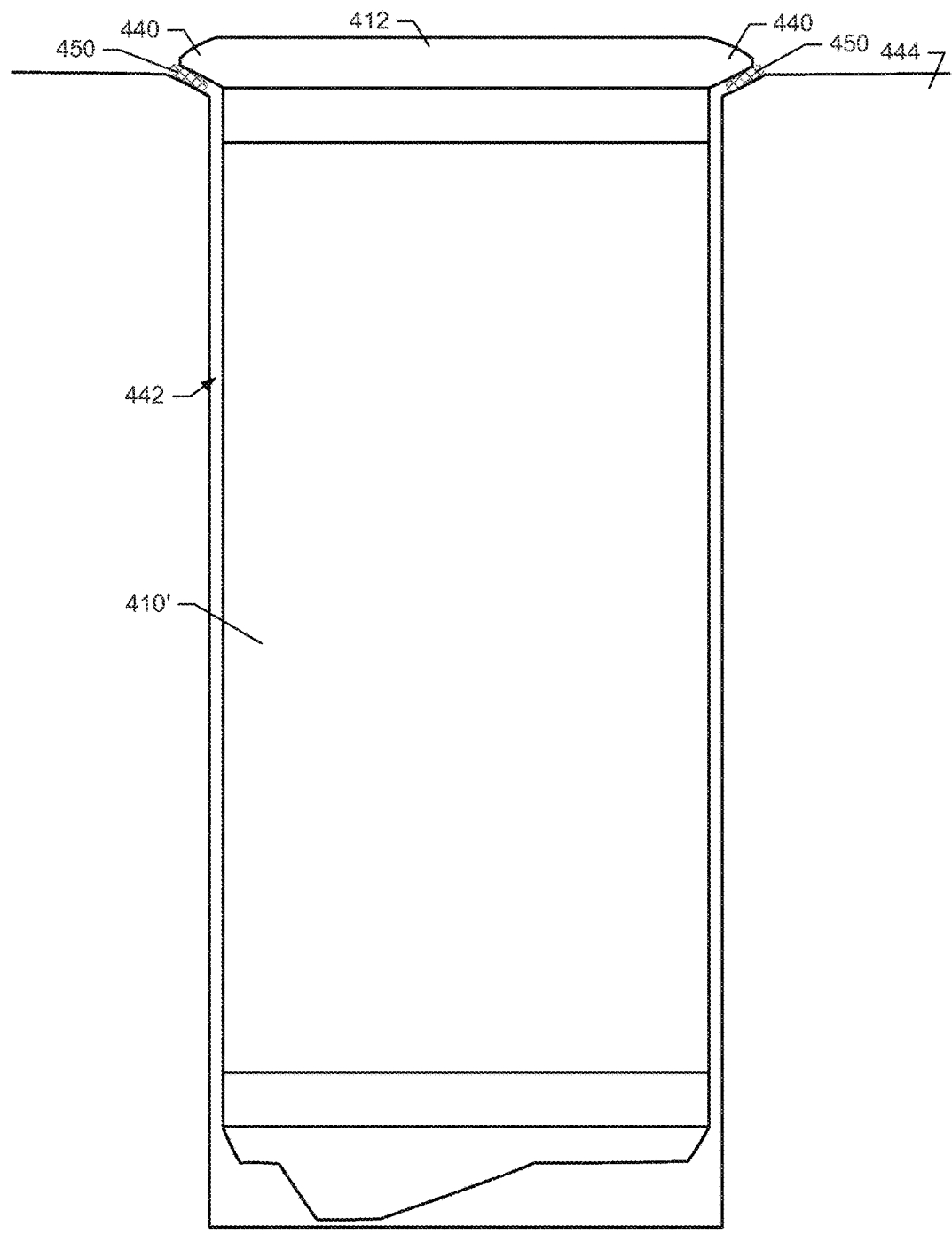
FIG. 4B illustrates a conceptual side view an example of a battery pack employing an extension portion according to an example embodiment.

In some cases, the cover top 412 may include an umbrella-like extension portion 440 that extends around the periphery of the cover top 412 to extend over edges of a battery reception cavity 442 in the power tool 444. FIG. 4B illustrates a conceptual side view an example of a battery pack 410' employing the extension portion 440 according to an example embodiment. In such an example, the extension portion 440 may include a seal or gasket 450 that fits between the cover top 412 extension portion and the surface of the power tool to provide waterproofing or for the exclusion of dust and debris from the cavity. Alternatively, the extension portion 440 may be a continuous and rigid surface that extends around the battery pack 410 top to engage a seal or gasket 450 that is provided around the battery compartment or battery reception cavity 442 of the device that is powered (e.g., the power tool 444).

In some embodiments, the electronics (e.g., the charge controller 130 and/or the power section 120) of the charger 420 may be in a converter box that may be provided in a cord unit that plugs into the mains power source. Thus, the charger base 422 and the body of the charger 420 that is shown in FIG. 4 may instead simply provide a charger adapter. One or more such charger adapters may then be added in series to connect to each other. The charge controller 130 may then direct either series or simultaneous charging of the battery packs. FIG. 5 illustrates charger electronics in a converter box 500 and a series of charger adapters (e.g., first charger adapter 510, second charger adapter 520 and third charger adapter 530) connected to each other via bus connections. Each charger adapter also includes its own respective battery pack (e.g., first battery pack 540, second battery pack 550 and third battery pack 560) being capable of being charged in accordance with example embodiments. However, it should also be appreciated that charging may alternatively be conducted directly while the battery pack is disposed within the power tool that is powered. Thus, for example, the power tool may have a charging connection that enables charging to occur while the battery pack is installed within the power tool. Moreover, in some cases, the power tool (with or without a backpack) may accommodate multiple battery packs that may be charged and/or discharged selectively in parallel or in series. In some embodiments, the power tool may fit within a wall mount device that may be coupled to a charger. Thus, for example, the power tool may sit in the wall mount and connect to the charger contacts provided in or on the wall mount.

The use of a relatively standard battery pack in many different devices with the ability to add additional packs suited to different needs may also enable relatively easy redesign of internal battery pack design features, while maintaining a consistent or standard interface to other devices. Multiple battery charger racks may also relatively easily be employed to charge a plurality of batteries simultaneously, or in series according to switch positions controlled by example embodiments.

FIG. 6, which includes FIGS. 6A and 6B, illustrates a top perspective view of a power tool 600 having a battery pack 610 fully inserted (FIG. 6B) and partially inserted (FIG. 6A) into a receiving cavity of the power tool 600 according to an example embodiment. As can be appreciated from the image of FIG. 6, there is no mechanically releasable clamping mechanism to hold the battery pack 610 in the cavity. Instead, the battery pack 610 may be moved to the position shown in FIG. 6 by operation of an electric motor that moves the battery pack 610 from the fully seated position (in which the battery pack 610 powers the power tool 600) to the position shown in FIG. 6 where the electrical connection is broken between the power tool 600 and the battery pack 610.

In an example embodiment, a battery charging system (or a battery pack for charging within such system) is provided. The battery charging system may include one or more battery packs each of which includes control circuitry and a switching assembly, and a charger including a power section and a charge controller. The charge controller and/or the control circuitry may be configured to direct operation of the switching assembly to control charging of the one or more battery packs.

The battery charging system (or battery pack) of some embodiments may include additional features that may be optionally added. For example, in some embodiments, (1) the switching assembly may have programmable switch actuation values. In such a tool, (2) the charger may be configured to charge the one or more battery packs either sequentially or simultaneously dependent upon settings of the switching assembly as provided by the charge controller and/or the control circuitry. Additionally or alternatively, (3) the one or more battery packs may each include an end of life circuit to enable cells of the battery pack to be discharged responsive to positioning of the switching assembly. Additionally or alternatively, (4) the one or more battery packs may each include a smart fuse circuit to enable isolation of one or more cells of the one or more battery packs. In an example embodiment, (5) the smart fuse circuit is activated on the basis of parameters of the one or more battery packs or on the basis of a position of one or more switches and/or monitoring conditions of a device powered by the one or more battery packs.

In some embodiments, any or all of (1) to (5) may be employed, and the one or more battery packs may each include an end of life circuit to enable cells of the battery pack to be discharged. In some embodiments, any or all of (1) to (5) may be employed, and the one or more battery packs may each include a battery release circuit to enable a locking mechanism holding the one or more battery packs to respective power tools to be released under control of the control circuitry. In some embodiments, any or all of (1) to (5) may be employed, and the one or more battery packs may each include a battery release circuit to provide powered movement of a battery pack out of electrical contact with a power tool with which the battery pack is operably coupled. In some embodiments, any or all of (1) to (5) may be employed, and the one or more battery packs may each include a smart fuse circuit to enable sequential or simultaneous discharge of multiple ones of the battery packs within a single power tool. In some embodiments, any or all of (1) to (5) may be employed, and the system may further include a sensor network configured to measure battery operational parameters, wherein the one or more battery packs each include a smart fuse circuit to enable isolation of the one or more battery packs via the switch assembly based on the operational parameters. In some embodiments, any or all of (1) to (5) may be employed, and the one or more battery packs may include an umbrella-like extension portion that extends around a periphery of one longitudinal end cap of the one or more battery packs, the extension portion extending over edges of a battery pack reception cavity of a device powered by the one or more battery packs. In such an example, the device may include a gasket disposed around a reception cavity to interface with the extension portion to seal the reception cavity when the one or more battery packs are installed in the device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery charging system comprising:
   one or more battery packs each of which includes control circuitry and a switching assembly; and
   a charger including a power section and a charge controller,
   wherein the charge controller and/or the control circuitry are configured to direct operation of the switching assembly to control charging of the one or more battery packs, and wherein the one or more battery packs each include an end of life circuit configured to, responsive to actuation thereof by the control circuitry, permanently terminate operability of a respective battery pack by opening a link to isolate battery cells of the respective battery pack from output terminals of the respective battery pack, the end of life circuit further configured to discharge battery cells of the respective battery pack,
   wherein the control circuitry is further configured to be connectable with an external diagnostic tool to provide data to the diagnostic tool, receive an instruction to actuate the end of life circuit from the diagnostic tool, and actuate the end of life circuit in response to receiving the instruction.

2. The battery charging system of claim 1, wherein the switching assembly has programmable switch actuation values.

3. The battery charging system of claim 1, wherein the charger is configured to charge the one or more battery packs either sequentially or simultaneously dependent upon settings of the switching assembly as provided by the charge controller and/or the control circuitry.

4. The battery charging system of claim 1, wherein the end of life circuit is configured to enable cells of the respective battery pack to be discharged responsive to positioning of the switching assembly.

5. The battery charging system of claim 1, wherein the one or more battery packs each include a smart fuse circuit to enable isolation of one or more cells of the one or more battery packs.

6. The battery charging system of claim 5, wherein the smart fuse circuit is activated on the basis of parameters of the one or more battery packs or on the basis of a position of one or more switches and/or monitoring conditions of a device powered by the one or more battery packs.

7. The battery charging system of claim 1, wherein the one or more battery packs each include a battery release circuit to enable a locking mechanism holding the one or more battery packs to respective power tools to be released under control of the control circuitry.

8. The battery charging system of claim 1, wherein the one or more battery packs each include a battery release circuit to provide powered movement of a battery pack out of electrical contact with a power tool with which the battery pack is operably coupled.

9. The battery charging system of claim 1, wherein the one or more battery packs each include a smart fuse circuit to enable sequential or simultaneous discharge of multiple ones of the battery packs within a single power tool.

10. The battery charging system of claim 1, further comprising a sensor network configured to measure battery operational parameters, and wherein the one or more battery packs each include a smart fuse circuit to enable isolation of one or more battery cells of the one or more battery packs via the switching assembly based on the operational parameters.

11. The battery charging system of claim 1, wherein the one or more battery packs include an umbrella-like extension portion that extends around a periphery of one longitudinal end cap of the one or more battery packs, the extension portion extending over edges of a battery pack reception cavity of a device powered by the one or more battery packs.

12. The battery charging system of claim 11, wherein the device includes a gasket disposed around the reception cavity to interface with the extension portion to seal the reception cavity when the one or more battery packs are installed in the device.

13. A battery pack for a battery charging system, the battery pack comprising:
    control circuitry; and
    a switching assembly configured to interface between cells of the battery pack and a power section of a charger,
    wherein the control circuitry is configured to direct operation of the switching assembly to control charging of the cells of the battery pack, and wherein the battery pack includes an end of life circuit configured to, responsive to actuation thereof by the control circuitry, permanently terminate operability of the battery pack by opening a link to isolate battery cells of the battery pack from output terminals of the battery pack, the end of life circuit further configured to discharge the battery cells of the battery pack;
    wherein the control circuitry is further configured to be connectable with an external diagnostic tool to provide data to the diagnostic tool, receive an instruction to actuate the end of life circuit from the diagnostic tool, and actuate the end of life circuit in response to receiving the instruction.

14. The battery pack of claim 13, wherein the switching assembly has programmable switch actuation values.

15. The battery pack of claim 13, wherein the switching assembly is configured to define settings of switch values based on input from the control circuitry or a charge controller of the charger to enable the battery pack to be charged by the charger either sequentially or simultaneously with at least one other battery pack.

16. The battery pack of claim 13, wherein the end of life circuit is configured to enable cells of the battery pack to be discharged responsive to positioning of the switching assembly.

17. The battery pack of claim 13, wherein the battery pack includes a smart fuse circuit to enable isolation of one or more cells of the battery pack.

18. The battery pack of claim 17, wherein the smart fuse circuit is activated on the basis of parameters of the battery pack or on the basis of a position of one or more switches and/or monitoring conditions of a device powered by the battery pack.

19. The battery pack of claim 13, wherein the battery pack includes a battery release circuit to enable a locking mechanism holding the battery pack to a respective power tool to be released under control of the control circuitry.

20. The battery charging system of claim 1, wherein the end of life circuit is activated upon a voltage of one or more of the battery cells or one or more of the battery packs dipping below a threshold value.

\* \* \* \* \*